(12) United States Patent  (10) Patent No.: US 7,061,380 B1
Orlando et al.  (45) Date of Patent: Jun. 13, 2006

(54) MONITORING AND RECORDING TAG WITH RF INTERFACE AND INDICATOR FOR FAULT EVENT

(75) Inventors: Richard V. Orlando, Los Gatos, CA (US); Trevor A. Blyth, Sandy, UT (US)

(73) Assignee: Alta Analog, Inc., Campbell, CA (US)

( * ) Notice: Subject to any disclaimer, the term of this patent is extended or adjusted under 35 U.S.C. 154(b) by 161 days.

(21) Appl. No.: 10/701,913

(22) Filed: Nov. 5, 2003

Related U.S. Application Data

(60) Provisional application No. 60/424,308, filed on Nov. 7, 2002.

(51) Int. Cl.
  *G08B 13/14* (2006.01)
(52) U.S. Cl. ............... 340/572.1; 340/539.26; 340/572.8
(58) Field of Classification Search ............ 340/572.1, 340/572.8, 505, 539.26, 539.27, 539.29, 340/870.16, 870.17
  See application file for complete search history.

(56) References Cited

U.S. PATENT DOCUMENTS

| | | | | |
|---|---|---|---|---|
| 4,695,823 A | * | 9/1987 | Vernon | 340/447 |
| 5,528,228 A | * | 6/1996 | Wilk | 340/540 |
| 5,597,534 A | * | 1/1997 | Kaiser | 340/505 |
| 5,686,888 A | * | 11/1997 | Welles et al. | 340/539.13 |
| 5,936,523 A | * | 8/1999 | West | 340/572.1 |
| 6,445,976 B1 | * | 9/2002 | Ostro | 700/226 |
| 6,486,776 B1 | * | 11/2002 | Pollack et al. | 340/539.1 |
| 6,563,417 B1 | | 5/2003 | Shaw | |
| 6,600,418 B1 | | 7/2003 | Francis et al. | |
| 6,617,962 B1 | * | 9/2003 | Horwitz et al. | 340/10.4 |
| 6,712,276 B1 | * | 3/2004 | Abali et al. | 235/492 |
| 6,720,866 B1 | * | 4/2004 | Sorrells et al. | 340/10.4 |
| 6,859,745 B1 | * | 2/2005 | Carr et al. | 702/81 |
| 2002/0047781 A1 | * | 4/2002 | Fallah | 340/572.1 |
| 2003/0006907 A1 | * | 1/2003 | Lovegreen et al. | 340/870.16 |
| 2003/0146836 A1 | * | 8/2003 | Wood | 340/540 |
| 2003/0163287 A1 | * | 8/2003 | Vock et al. | 702/187 |
| 2004/0069850 A1 | * | 4/2004 | De Wilde | 235/385 |

* cited by examiner

*Primary Examiner*—Thomas Mullen
(74) *Attorney, Agent, or Firm*—Fernandez & Associates, LLP.

(57) ABSTRACT

A single integrated circuit provides communication, sensing and recording of one or more conditions critical to the entity to which it is attached. The chip is part of a larger module comprising a visual indicator, such as an LED, and a power source such as a battery. The sensor may be a temperature sensor whose output is stored in a non-volatile memory section of the chip on some periodic basis. A product identifier is stored on the chip; a method for product recall or location is described.

17 Claims, 3 Drawing Sheets

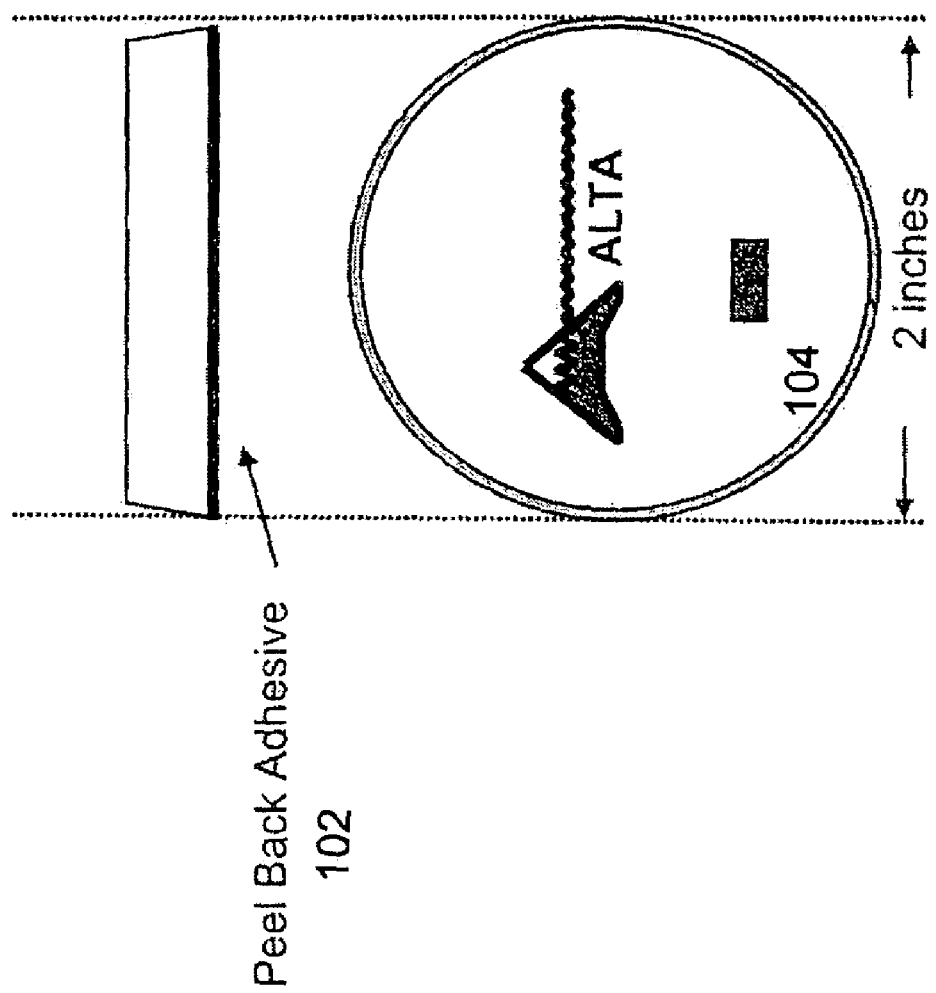

MONITORING AND RECORDING TAG WITH RF INTERFACE AND INDICATOR FOR FAULT EVENT

This application claims priority from U.S. Provisional Application Ser. No. 60/424,308 filed on Nov. 7, 2002.

FIELD OF INVENTION

Invention relates to a method of recording a sensor reading over an extended period of time and more particularly to communicating the contents of an alarm condition via radio frequency or a visual indicator.

BACKGROUND OF INVENTION

RF tags have come into use lately as a means of identification which can be remotely sensed. U.S. Pat. No. 6,563,417 describes an RFID tag mountable to a product or product carrier. The RFID tag contains different chips for computing, storage and sensing, as well as a battery and radio transceiver. The '417 patent also teaches a quite complex communication scheme; undoubtedly a very expensive tag.

There exists a need for a very inexpensive, even disposable, RF tag which can monitor one or more conditions in the environment and communicate in some manner when those conditions have exceeded some predetermined limit.

SUMMARY OF INVENTION

The Alta Analog Monitor 104 is a self contained environmental monitoring and recording device which is used to insure that sensitive goods and materials are not compromised during transit or storage from the place of manufacture up until the end user location. The monitor also enables a network based automated recall or location process which will identify product under recall anywhere in the distribution chain. The device is housed in a round molded plastic tag two inches in diameter and approximately 0.25 inches thick. The round molded plastic tag further includes a Peel Back Adhesive 102 for attachment to the goods and materials.

A single integrated circuit provides RF communicating capability, sensing and recording of one or more conditions critical to the entity to which it is attached. The chip is part of a larger module comprising a visual indicator, such as an LED, and a power source such as a battery. The sensor may be a temperature sensor whose output is stored in a non-volatile and rewritable memory section of the chip on some periodic basis. Based upon the sensor values, instantaneous or averaged in some fashion, the visual indicator will communicate an alarm condition. This may be by flashing, if an LED for instance, or, if an LCD display, by displaying a symbol or group of symbols. The stored values are available for transmission via the RF transceiver. Depending on the application it may be more convenient to have the RF antenna as part of the module versus keeping it internal to the integrated circuit.

BRIEF DESCRIPTION OF DRAWINGS

FIG. 1 is sketch of the Alta Analog Monitor as a product.

DETAILED DESCRIPTION OF PREFERRED EMBODIMENT

Figure 2A:
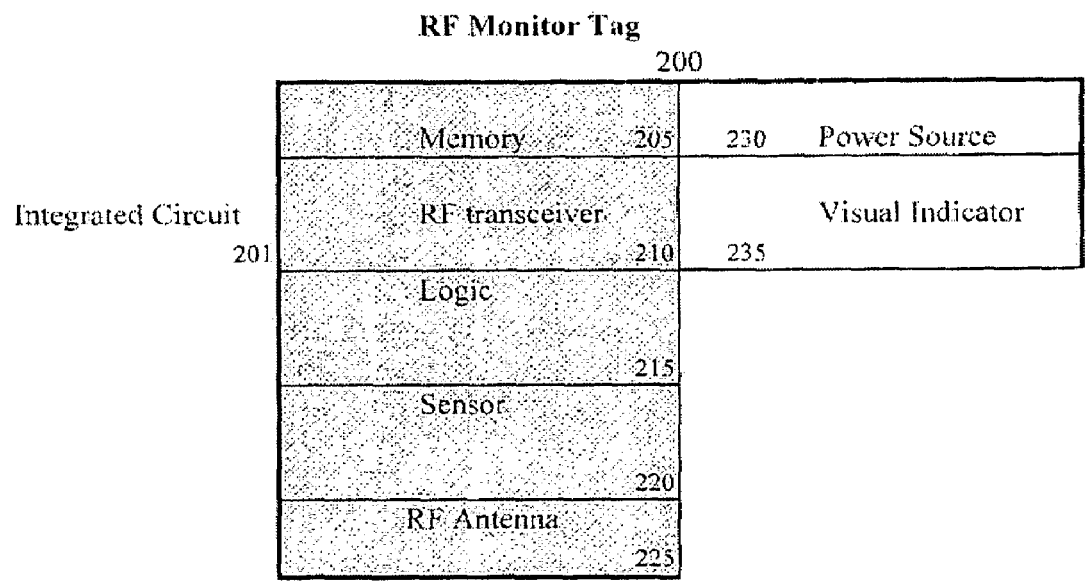
FIGS. 2A and 2B are block diagrams of the RF Monitor Tag and integrated circuit.

The RF Monitor tag device consists of an integrated circuit 201 or 203; a visual indicator 235, such as an LED, a liquid crystal display, a TFT display, or a light bulb; a power source 230, such as a lithium battery; and an RF antenna encapsulated into a molded tag; optionally the antenna may be on the integrated circuit. The integrated circuit provides multiple functions including communication via the RF transceiver section, logic for interpreting commands, environmental monitoring, timekeeping and time-of-day recording, storage of the sensor readings, a product identifier, manufacturing history and other information relevant to the user.

The monitor contains an integrated radio frequency or RF interface which provides a communication link to the tag without requiring an electrical connection or close proximity; distances greater than 10 meters are achievable. This interface is used to initialize the tag during product pack and ship as well as to read out the sensor histogram. Since the tag records the time and date of each environmental sample, it becomes quite easy to identify at what time the product was placed in an improper environment and who was responsible for this condition.

The integrated circuit contains at least one sensor 220 or 226 used to measure ambient conditions. The IC also contains non-volatile, erasable memory capability 205 or 206, such as electrically erasable memory cells, which are used to store the sensor readings on some predetermined or programmable basis. Sensor limits which constitute a fault condition are programmable. Ambient conditions sensed may be temperature, pressure, humidity, various gas levels, acceleration or others which can be incorporated into an IC. While being able to reprogram the memory on the chip is one aspect of the preferred embodiment it is not the only embodiment of this invention. One-time-programmable memory as well as battery backed-up volatile memory are optional embodiments; as well as other choices obvious to one knowledgeable in the art.

The device also has the ability to store a product identification code of multiple characters which can be used in lieu of a barcode label for automated product tracking, receiving and invoicing operations. For instance, a product code of 64 characters is sufficient to store multiple pieces of information including data necessary to implement an automated recall function.

In one embodiment, a unique Product Identification Code is used to identify the product. A certain portion of this product code may be dedicated to information useful in a product recall situation. The integrated circuit provides the logic necessary to identify if an individual monitor tag is included in a recall when queried by an external communicator. The IC can then respond via RF or initiate the visual indicator or both. Alternatively, the monitor tag sends product identification to a reader terminal and the reader terminal performs the comparison; the reader may initiate the visual indicator.

In one embodiment the device is configured to record data in memory once per hour. A real time clock counts the time and the memory records the temperature. A comparator compares the recorded temperature against a programmable temperature limit and increments the fault profile counter. If the fault profile counter exceeds the programmed number of sample intervals the fault condition is set and recorded. The LED logic flashes the LED if the tag is in fault condition.

The RF circuitry monitors RF signals and performs operations on configuration and recording memory based on commands received.

In one embodiment the sensor is a temperature sensor and the visual indicator is a LED. It is used to monitor and record the temperature of a food product, such as meat or fish, from the production point, through the distribution channel, to the end use point. The temperature is sensed and recorded on an hourly basis. Should the temperature exceed a maximum number, which is settable by the user, or exceed a lower, settable, temperature for a predetermined time, then the LED will turn on, typically at a 50% flash rate, to indicate an over temperature alarm condition. The information is also available through the RF communicator. Tags which display a temperature fault may be read to determine a histogram of temperature information with the associated date and time. The severity of the temperature profile can be determined. In addition, the responsible party can be identified and corrective action taken. One knowledgeable in the art will see many alternative uses for this device.

As another example of the monitor's capability, the device contains a programmable profile based on a time-temperature relationship which is used to determine if the product has been compromised. Two such profiles can be programmed into the tag, one for an under temperature limit and one for an over temperature limit. Each profile consists of a temperature limit, over or under, and elapsed time, in sampling intervals that the product cannot be exposed to before it becomes compromised. The device will monitor and record temperature at a programmable interval from once every 5 minutes to once every hour. In one version, the total capacity of the device is 10,000 readings which will give a total recording time ranging from 34 days at 5 minute sample intervals to 416 days at 1 hour sample intervals. In the event that a temperature fault occurs, a Red LED will begin to flash as a visual signal that the product has been compromised.

In one embodiment the RF tag device is used in conjunction with an RF terminal which issues commands and receives data from the individual tags. Exemplary instructions which the RF terminal can issue are:

Configuration: to configure the operational mode.
Programming: to program information into a tag.
Tag Polling: to read the Tag ID of tags in the immediate area.
Tag Addressing: to initiate communications with a specific Tag.
Tag Download: to download stored information from the tag to the reader.
Tag Upload: to upload information from the reader to the tag.
Broadcast Messaging: to communicate with all tags in the immediate area.

In one embodiment configuration of the RF monitor tag is accomplished by a special instruction which requires privileged access. Privileges can be limited to the RF terminals that are in the processing plant where the product originates. Remote RF terminals may be enabled in a "read only" mode of operation. Alternatively, once initialized, the tag can be configured as a read-only device.

In one embodiment the RF terminals have access to a broadcasting system. An example is dial-up access to the internet in which a web site is used to list product information to be recalled. Contact with the broadcast system may be initiated by an event or at certain intervals. When there are products being recalled, the RF terminals obtain Product Identification Codes from the broadcast system and determine whether there is a match with tags in the vicinity. Code comparison is made in either the tag or the terminal. Alternatively, those tags which are affected by the recall may indicate so by signaling with their visual indicator. The RF terminal can upload the product/tag ID to the central broadcast system. This information may be compared to the shipping logs of the products to not only track the identified products, but also to determine the tags which have not yet been identified or located. Customers can then be contacted.

As another example of how a product recall, or even just locating where product may be, may proceed, information identifying the material to be recalled or located is placed on a network site. The RF terminals located in the distribution warehouses and end customer locations are programmed to access the network site through a network connection several times per day. If a recall is in progress, the terminals will download the identification information and broadcast it to any product within its range, 10 meters.

The invented monitor tags will analyze the data to determine individually if they are part of the recalled product and, if so, they will begin flashing their LED and identify themselves to the local RF terminal providing their entire character identification code. The RF terminals will then pass the identification codes of any product that they found to the network site. At any point in time, the identified/located product list on the network site can be compared to the shipping log at the factory to determine what portion of the recalled material has been identified and located as well as where the non-located material was shipped to. In this case, an automated FAX, EMAIL or phone call can be made to the receiver of the missing material to inform them that they need to locate the product for a recall. Remote terminals could also be included in shipping trucks and containers to identify and locate product in transit.

Figure 2B:
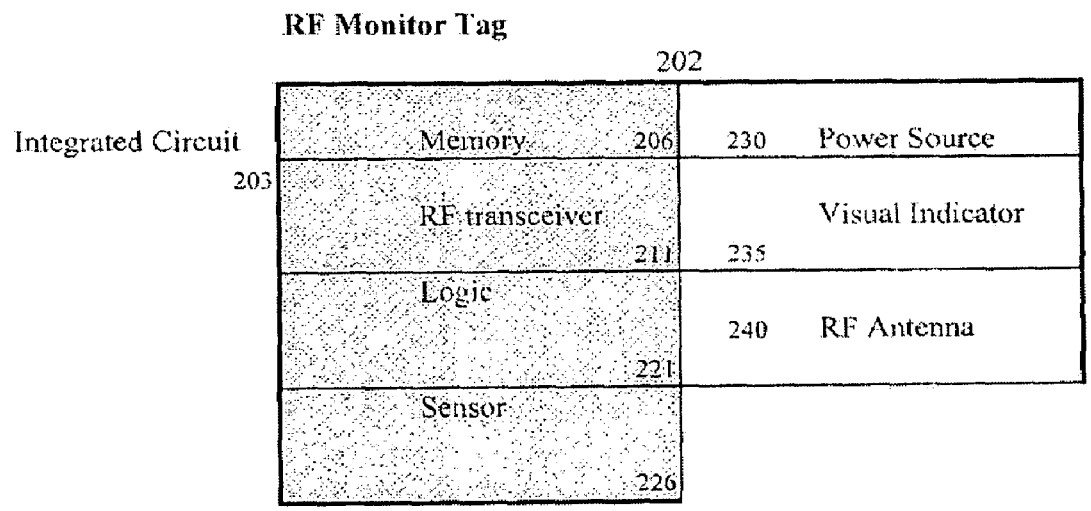

In FIG. 2A one embodiment is shown of the RF Monitor Tag 200 with integrated circuit 201 containing memory 205, RF transceiver 210, logic 215, sensor 220 and RF antenna 225. Alternatively, FIG. 2B shows RF Monitor Tag 202 with the RF antenna 240 on the module portion as opposed to the integrated circuit portion, both portions still contained within the RF Monitor Tag. In FIG. 2B the other embodiment is shown of the RF Monitor Tag 202 with integrated circuit 203 containing memory 206, RF transceiver 211, logic 221, and sensor 226.

Figure 3:
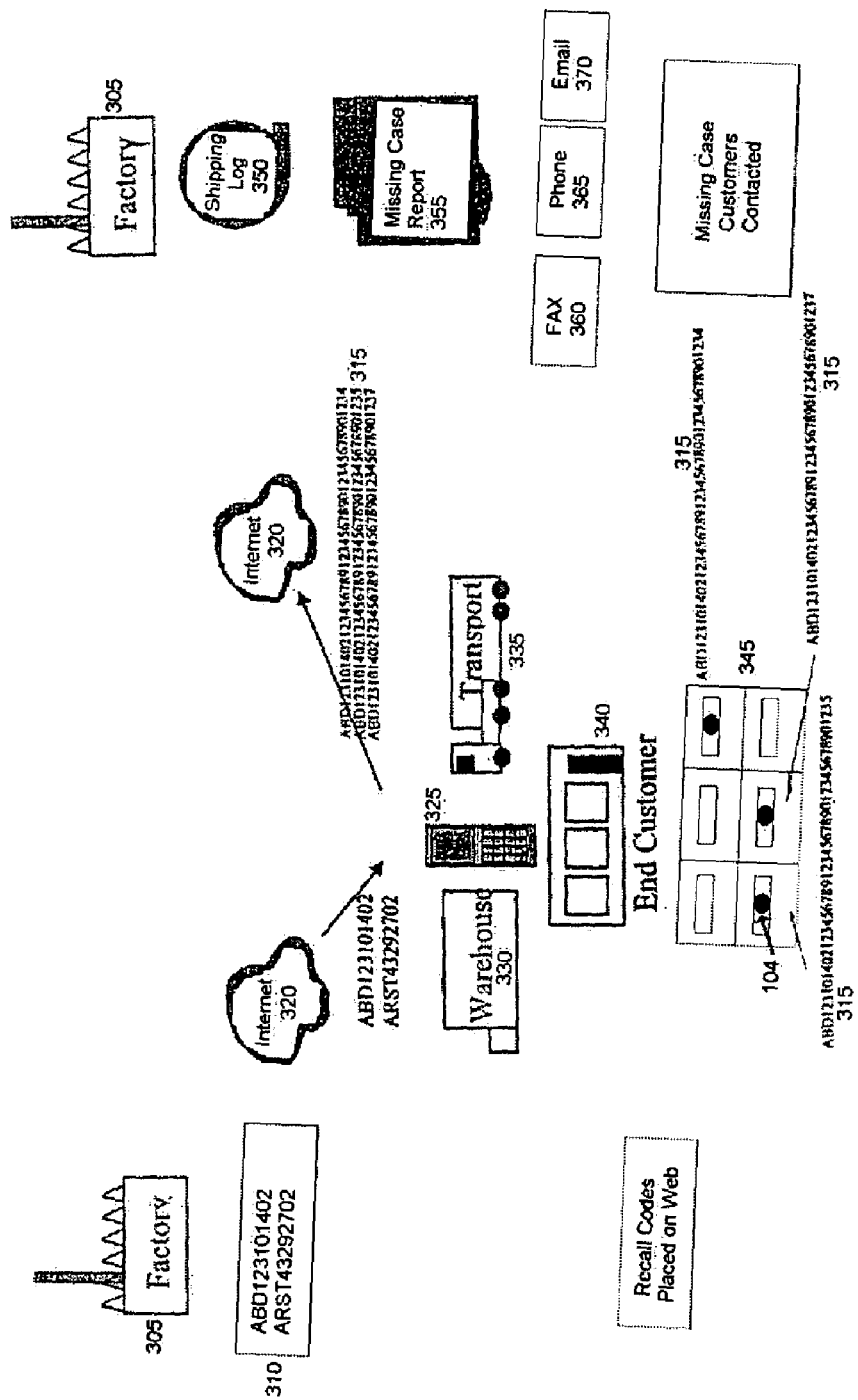
FIG. 3 is a schematic diagram of the method of transporting and locating items in the distribution system.

In the diagram in FIG. 3, a recall is issued from factory 305 with the following production lot and production date recall codes 310: ABD123101402 and ARST43292702. These codes are entered into the secure website 320. The remote RF terminals 325 download these recall codes and broadcast them in their immediate area to, for example, a warehouse 330, a transport 335, or an end customer 340. In this example, three boxes of product 345 identify themselves and start blinking their LED's. Other boxes of product 345 not affected by the recall do not turn on their LED's. The remote RF terminals transmit the three product ID codes 315 back to the website as well as their unique location ID. The website then generates a missing product report 355 by comparing the Shipping Log 350 to the product which has been identified and located to list the product which needs to be manually located by contacting the missing case customers via FAX 360, Phone 365, or EMAIL 370.

Foregoing described embodiments of the invention are provided as illustrations and descriptions. They are not intended to limit the invention to precise form described. In particular, it is contemplated that functional implementation of invention described herein may be implemented equivalently in hardware, software, firmware, and/or other available functional components or building blocks. Other variations and embodiments are possible in light of above teachings, and it is thus intended that the scope of invention not be limited by this Detailed Description, but rather by Claims following.

The invention claimed is:

1. A radio frequency monitor tag for recording an ambient condition comprising:
    an integrated circuit with an ambient condition sensor,
    a visual indicator for indicating a condition, and
    a power source.

2. The radio frequency monitor tag of claim 1 wherein the integrated circuit comprises:
    a non-volatile memory for storing selected data,
    a RF transceiver for communicating data,
    an RF antenna,
    the ambient condition sensor, and
    logic circuits for analyzing data.

3. The RF monitor tag of claim 1 wherein the visual indicator is taken from the group comprising a light emitting diode, a liquid crystal display, a TFT display and a light bulb.

4. The RF monitor tag of claim 2 wherein said non-volatile memory contains an identification code.

5. The RF monitor tag of claim 2 wherein said sensor contains one or more sensors from the group comprising temperature, pressure, acceleration, humidity, oxygen, hydrogen, carbon monoxide, and carbon dioxide.

6. The RF monitor tag of claim 2 wherein said non-volatile memory is reprogrammable.

7. A method of tracking the ambient conditions of an object over an extended period of time wherein the object has attached to it a radio frequency monitor tag with a visual indicator, a non-volatile memory for storing selected data, an ambient condition sensor, logic circuits for analyzing time data and ambient condition data and preprogrammed ambient condition limits and comprising the steps:
    said radio frequency monitor tag determining if a preprogrammed ambient condition limit has been met, the radio frequency monitor tag stores the ambient condition sensor readings in a memory on the radio frequency monitor tag such that the sensor readings can be accessed at a later time, and the visual indicator of said radio frequency monitor tag indicating when said preprogrammed ambient condition limits have been met.

8. The method of claim 7 wherein the radio frequency monitor tag stores data comprising the ambient condition sensed and the time at which it was sensed on a periodic basis such that the ambient condition sensor readings can be accessed at a later time.

9. A method of tracking the ambient conditions of an object over an extended period of time wherein the object has attached to it a radio frequency
    monitor tag wherein ambient conditions are monitored and recorded at a programmable interval such that the total recording time can be modified with preprogrammed ambient condition limits and a radio frequency terminal downloads information from said radio frequency monitor tag to verify whether or not ambient condition limits have been met.

10. A method of tracking the ambient conditions of an object over an extended period of time wherein the object has attached to it
    a radio frequency monitor tag with preprogrammed ambient condition limits
    and a radio frequency terminal downloads information from said radio frequency monitor tag to verify whether or not ambient condition limits have been met, and
    further comprising the step of the radio frequency terminal instructs the radio frequency monitor tag meeting the limits to visually indicate whether or not the limits have been met.

11. A radio frequency monitor tag for recording an ambient condition comprising:
    an integrated circuit with an embedded sensor,
    a visual indicator for indicating a condition,
    a radio frequency antenna, and
    a power source.

12. The radio frequency monitor tag of claim 11 wherein the integrated circuit comprises:
    a non-volatile memory for storing selected data,
    a RF transceiver for communicating data,
    the embedded sensor, and
    logic circuits for analyzing data.

13. The RF monitor tag of claim 11 wherein the visual indicator is taken from the group comprising a light emitting diode, a liquid crystal display, a TFT display and a light bulb.

14. The RF monitor tag of claim 12 wherein said non-volatile memory contains an identification code.

15. The RF monitor tag of claim 11 wherein said sensor contains one or more sensors from the group comprising temperature, pressure, acceleration, humidity, oxygen, hydrogen, carbon monoxide, and carbon dioxide.

16. The RF monitor tag of claim 12 wherein the non-volatile memory is reprogrammable.

17. A method of tracking the ambient conditions of an object over an extended period of time wherein the object has attached to it a radio frequency monitor tag, in communication with a radio frequency terminal, comprising a visual indicator, a non-volatile memory for storing selected data, an ambient condition sensor, logic circuits for analyzing time data and ambient condition data and preprogrammed ambient condition limits and comprising the steps:
    said radio frequency monitor tag determining if a preprogrammed ambient condition limit has been met, and said visual indicator of said radio frequency monitor tag indicating when such preprogrammed ambient condition limit has been met, and
    said radio frequency terminal downloads information from said radio frequency monitor tag to verify whether or not ambient condition limits have been met.

* * * * *